(12) United States Patent
Motoyama et al.

(10) Patent No.: US 10,535,140 B2
(45) Date of Patent: Jan. 14, 2020

(54) IMAGE PROCESSING APPARATUS, METHOD AND COMPUTER-READABLE MEDIUM FOR BINARIZING SCANNED DATA

(71) Applicant: BROTHER KOGYO KABUSHIKI KAISHA, Nagoya, Aichi (JP)

(72) Inventors: Toshiki Motoyama, Konan (JP); Tomohiko Hasegawa, Okazaki (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 59 days.

(21) Appl. No.: 15/824,221

(22) Filed: Nov. 28, 2017

(65) Prior Publication Data

US 2018/0150958 A1 May 31, 2018

(30) Foreign Application Priority Data

Nov. 30, 2016 (JP) .................................. 2016-231933

(51) Int. Cl.
| | |
|---|---|
| *G06K 9/38* | (2006.01) |
| *G06T 7/136* | (2017.01) |
| *G06T 7/13* | (2017.01) |
| *G06T 5/00* | (2006.01) |
| *G06T 5/40* | (2006.01) |
| *G06T 5/20* | (2006.01) |

(52) U.S. Cl.
CPC .............. *G06T 7/136* (2017.01); *G06T 5/002* (2013.01); *G06T 5/20* (2013.01); *G06T 5/40* (2013.01); *G06T 7/13* (2017.01); *G06T 2207/20024* (2013.01); *G06T 2207/30176* (2013.01)

(58) Field of Classification Search
CPC .............. G06T 7/136; G06T 7/11; G06T 7/36
See application file for complete search history.

(56) References Cited

U.S. PATENT DOCUMENTS

| 5,784,500 A * | 7/1998 | Homma | .................... G06K 9/38 |
| | | | 358/466 |
| 7,110,607 B2 * | 9/2006 | Fujimoto | ................. G06K 9/38 |
| | | | 358/3.11 |
| 8,576,446 B2 * | 11/2013 | Tian | ........................ H04N 1/409 |
| | | | 358/2.99 |
| 2007/0140577 A1 * | 6/2007 | Ahmed | .................... G06K 9/38 |
| | | | 382/254 |

(Continued)

FOREIGN PATENT DOCUMENTS

| JP | 2002-290748 A | 10/2002 |
| JP | 2013-196369 A | 9/2013 |

*Primary Examiner* — Gregory M Desire
(74) *Attorney, Agent, or Firm* — Scully Scott Murphy and Presser (57) ABSTRACT

An image processing apparatus includes a controller configured to control an image scanner to generate scanned data by scanning an image recorded on a document sheet, calculate an edge intensity of each of pixels included in the scanned data, determine a binarization threshold from pixel values of particular pixels, the particular pixels being a part of the pixels included in the scanned data, each particular pixel having a density value higher than density values of surrounding pixels thereof and having an edge intensity equal to or higher than an edge threshold, and generate a binary image from the scanned data, using the binarization threshold.

12 Claims, 5 Drawing Sheets

(56) References Cited

U.S. PATENT DOCUMENTS

| | | | |
|---|---|---|---|
| 2011/0043864 A1* | 2/2011 | Tian | H04N 1/409 |
| | | | 358/3.26 |
| 2013/0195345 A1* | 8/2013 | Nammoto | G06T 7/001 |
| | | | 382/141 |
| 2013/0243321 A1 | 9/2013 | Shimazaki | |
| 2017/0287252 A1* | 10/2017 | Laddha | G07D 7/2016 |
| 2018/0005340 A1* | 1/2018 | Otake | H04N 1/642 |
| 2018/0150958 A1* | 5/2018 | Motoyama | G06T 7/11 |

* cited by examiner

IMAGE PROCESSING APPARATUS, METHOD AND COMPUTER-READABLE MEDIUM FOR BINARIZING SCANNED DATA

CROSS-REFERENCE TO RELATED APPLICATION

This application claims priority under 35 U.S.C. § 119 from Japanese Patent Application No. 2016-231933 filed on Nov. 30, 2016. The entire subject matter of the application is incorporated herein by reference.

BACKGROUND

Technical Field

The following description relates to aspects of an image processing apparatus, a method, and a computer-readable medium for binarizing scanned data.

Related Art

Heretofore, an image processing apparatus has been known that is configured to binarize scanned data generated by scanning an image recorded on a document sheet. For instance, a method has been known that is adapted to generate a histogram of pixels forming scanned data and binarize the scanned data based on an edge intensity of each pixel when the scanned data includes both character components and non-character components.

SUMMARY

Figure 5A:
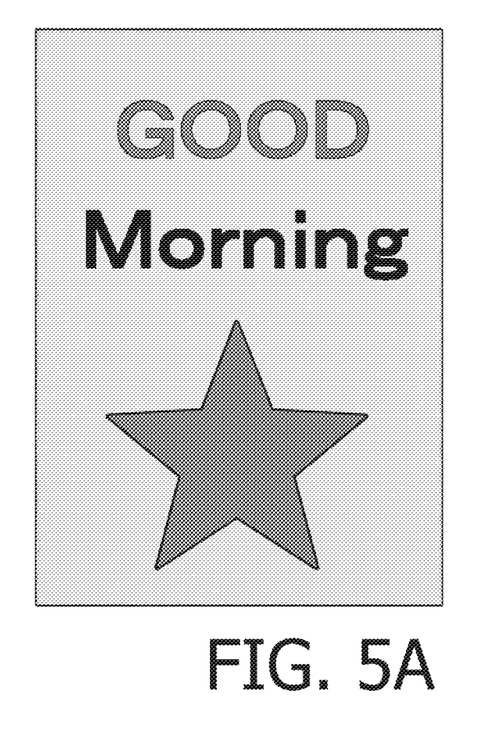
FIG. 5A shows a document sheet to be scanned, in the illustrative embodiment according to one or more aspects of the present disclosure.

Suppose, for instance, that scanned data generated from a document shown in FIG. 5A is binarized. First, a luminance histogram of pixels which form an image shown in FIG. 5A is generated as indicated by a dashed line in FIG. 6. In order to appropriately binarize the scanned data, a luminance value between a frequency peak of pixels forming a pattern "GOOD" and a frequency peak of pixels forming a background color needs to be used as a binarization threshold.

Figure 6:
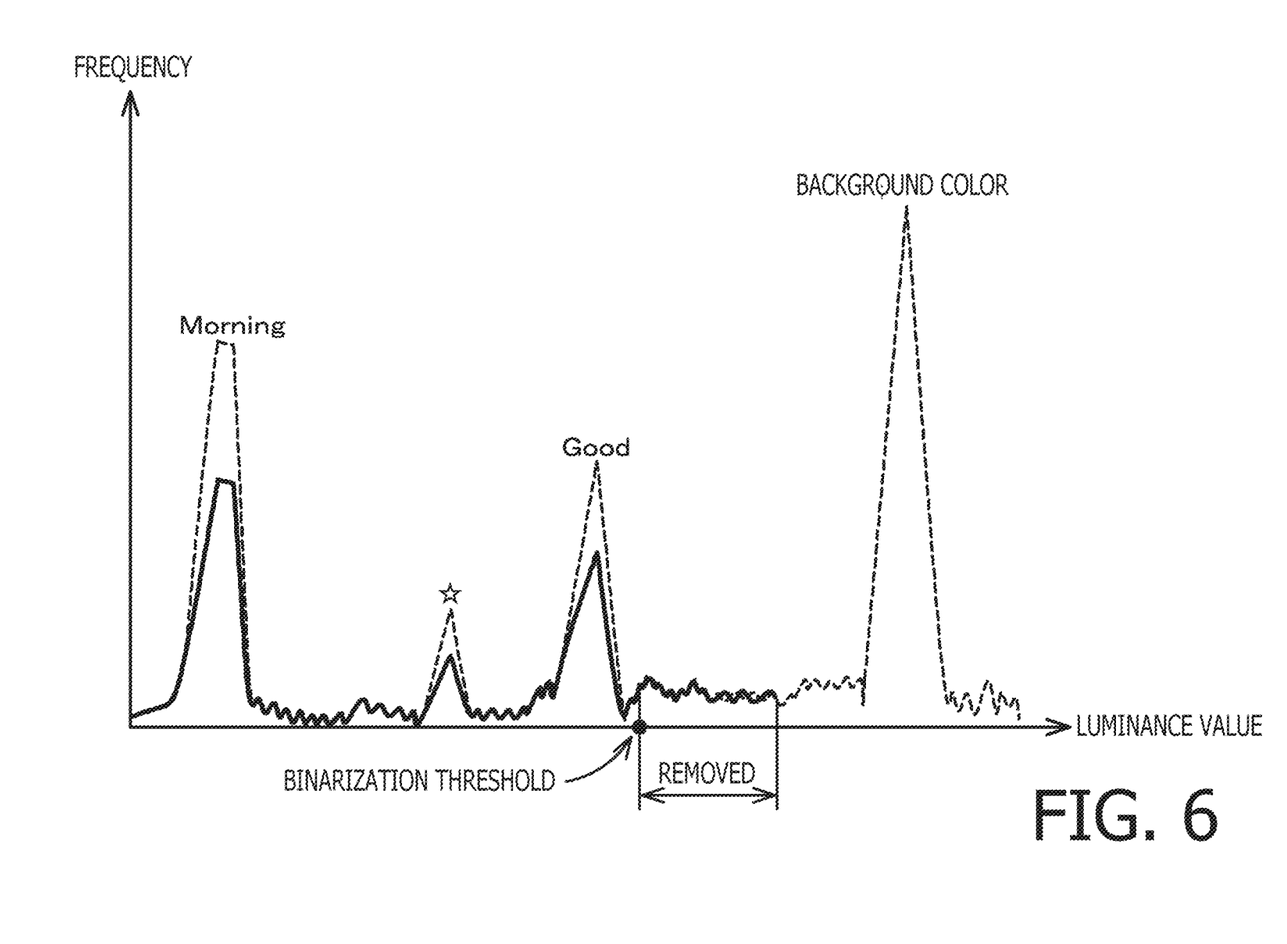
FIG. 6 is a luminance histogram of scanned data of the document sheet shown in FIG. 5A, in the illustrative embodiment according to one or more aspects of the present disclosure.

However, when a difference is small between the luminance value of the pixels forming the pattern "GOOD" and the luminance value of the pixels forming the background color, a luminance value between a frequency peak of pixels forming a pattern "☆" and a frequency peak of pixels forming the pattern "GOOD" might be used as a binarization threshold. Then, when noise removal for the scanned data is performed using that binarization threshold, the pixels forming the pattern "GOOD" might be filled in the background color.

Aspects of the present disclosure are advantageous to provide one or more improved techniques, for an image processing apparatus, which make it possible to generate a binary image in which patterns and a background color contained in scanned data are appropriately separated.

According to aspects of the present disclosure, an image processing apparatus is provided that includes an image scanner and a controller. The controller is configured to control the image scanner to generate scanned data by scanning an image recorded on a document sheet, calculate an edge intensity of each of pixels included in the scanned data, determine a binarization threshold from pixel values of particular pixels, the particular pixels being a part of the pixels included in the scanned data, each particular pixel having a density value higher than density values of surrounding pixels of the particular pixel, each particular pixel having an edge intensity equal to or higher than an edge threshold, and generate a binary image from the scanned data, using the binarization threshold.

According to aspects of the present disclosure, further provided is a method implementable on a processor coupled with an image scanner. The method includes controlling the image scanner to generate scanned data by scanning an image recorded on a document sheet, calculating an edge intensity of each of pixels included in the scanned data, determining a binarization threshold from pixel values of particular pixels, the particular pixels being a part of the pixels included in the scanned data, each particular pixel having a density value higher than density values of surrounding pixels of the particular pixel, each particular pixel having an edge intensity equal to or higher than an edge threshold, and generating a binary image from the scanned data, using the binarization threshold.

According to aspects of the present disclosure, further provided is a non-transitory computer-readable medium storing computer-readable instructions that are executable on a processor coupled with an image scanner. The instructions are configured to, when executed by the processor, cause the processor to control the image scanner to generate scanned data by scanning an image recorded on a document sheet, calculate an edge intensity of each of pixels included in the scanned data, determine a binarization threshold from pixel values of particular pixels, the particular pixels being a part of the pixels included in the scanned data, each particular pixel having a density value higher than density values of surrounding pixels of the particular pixel, each particular pixel having an edge intensity equal to or higher than an edge threshold, and generate a binary image from the scanned data, using the binarization threshold.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
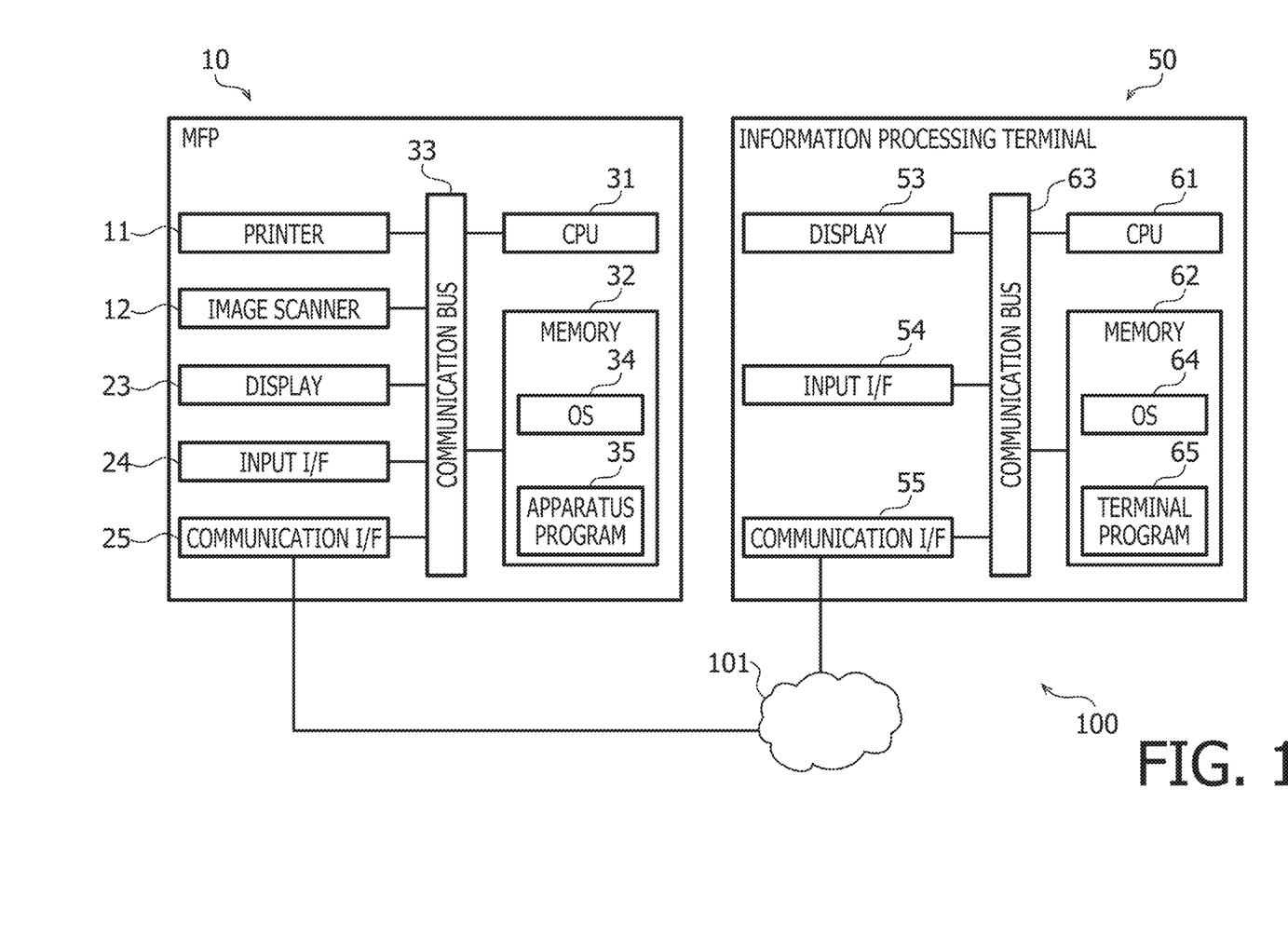
FIG. 1 is a block diagram schematically showing a configuration of a system in an illustrative embodiment according to one or more aspects of the present disclosure.

FIG. 1 schematically shows a configuration of a system 100 in an illustrative embodiment according to aspects of the present disclosure. As shown in FIG. 1, the system 100 includes a multi-function peripheral (hereinafter referred to as an "MFP") 10 and an information processing terminal 50. Further, the system 100 may include an apparatus having a single function of image scanning, instead of the MFP 10. The MFP 10 and the information processing terminal 50 are configured to communicate with each other via a communication network 101. Examples of the communication network 101 may include but are not limited to an Internet, a wired LAN, a wireless LAN, and a combination of at least two of them. Alternatively, the MFP 10 and the information processing terminal 50 may be communicably connected with each other via a USB cable or the like.

As shown in FIG. 1, the MFP 10 includes a printer 11, an image scanner 12, a display 23, an input interface (hereinafter referred to as an "input I/F") 25, a CPU 31, a memory 32, and a communication bus 33. The elements included in the MFP 10 are interconnected via the communication bus 33.

The printer 11 is configured to perform a printing operation of recording on a sheet an image represented by image data. As a recording method of the printer 11, known methods such as an inkjet method and an electrophotographic method may be employed. The image scanner 12 is configured to scan an image recorded on a document sheet and generate image data (hereinafter referred to as "scanned data"). Nonetheless, the printer 11 may be omitted.

The display 23 may be a liquid crystal display, an organic light emitting display, or the like. The display 23 includes a display screen for displaying various kinds of information.

The input I/F 24 is a user interface for accepting an input operation by a user. Specifically, the input I/F 24 includes buttons, and is configured to, when a button is pressed, transmit an operation signal associated with the pressed button to the CPU 31. Further, the input I/F 24 may include a film-like touch sensor overlaid on a display surface of the display 23. The user is allowed to perform an operation (hereinafter, which may be referred to as a "user operation") of designating an object displayed on the display surface of the display 23 or inputting a character string and/or a numerical string. Examples of the "object" may include a character string, an icon, a button, a link, a radio button, a checkbox, and a pulldown menu, and the like displayed on the display 23.

When configured as a touch sensor, the input I/F 24 outputs positional information indicating a position on the display surface that the user has touched. It is noted that, in the present disclosure, "touch" may include every operation of bringing an input medium into touch with the display surface of the display 23. Further, an operation (e.g., "hover" or "floating touch") of bringing the input medium in proximity to the display surface even without bringing the input medium in touch with the display surface may be included in the concept of the aforementioned "touch." Further, the input medium may be a user's finger, a stylus, a touch pen, or the like. The user is allowed to perform a user operation of tapping a position of an object displayed on the display 23 with the input medium so as to designate the object.

The communication I/F 25 is an interface configured to communicate with external devices via the communication network 101. Namely, the MFP 10 is allowed to transmit various kinds of information to an external device via the communication I/F 25 and receive various kinds of information from an external device via the communication I/F 25. For instance, a communication technology for the communication I/F 25 may be but is not limited to Wi-Fi (trademark registered). In addition, when the MFP 10 is connected with the information processing terminal 50 via a USB cable, the communication I/F 25 may be a USB interface configured such that the USB cable is detachably attached thereto.

The CPU 31 is configured to take overall control of the MFP 10. Based on various kinds of information output from the input I/F 24 and various kinds of information received from an external device via the communication I/F 25, the CPU 31 acquires below-mentioned programs from the memory 32 and executes the programs. The CPU 31 and the memory 32 may form an example of a "controller" according to aspects of the present disclosure.

The memory 32 stores an OS 34 and an apparatus program 35. The apparatus program 35 may be a single program or an aggregation of programs. Additionally, the memory 32 stores data and information necessary for execution of the apparatus program 35. The memory 32 may include but is not limited to a RAM, a ROM, an EEPROM, an HDD, a portable storage medium (e.g., a USB memory) detachably attached to the MFP 10, a buffer of the CPU 31, and a combination of at least two of them.

The memory 32 may be a non-transitory computer-readable storage medium. The non-transitory computer-readable medium may include but is not limited to a CD-ROM and a DVD-ROM as well as aforementioned storage media. The non-transitory medium is also a tangible medium. In contrast, an electrical signal carrying a program downloaded from a server on the Internet is a computer-readable signal medium but is not included in the non-transitory computer-readable medium. The same applies to a below-mentioned memory 62 of the information processing terminal 50.

As shown in FIG. 1, the information processing terminal 50 includes a display 53, an input I/F 54, a communication I/F 55, a CPU 61, a memory 62, and a communication bus 63. The display 53, the input I/F 54, the communication I/F 55, the CPU 61, the memory 62, and the communication bus 63 included in the information processing terminal 50 have substantially the same configurations as the display 23, the input I/F 24, the communication I/F 25, the CPU 31, the memory 32, and the communication bus 33 included in the MFP 10. Therefore, explanations of them will be omitted. For instance, the information processing terminal 50 may be but is not limited to a mobile phone, a smartphone, a tablet terminal, or a PC.

[Operations by System]

Figure 2:
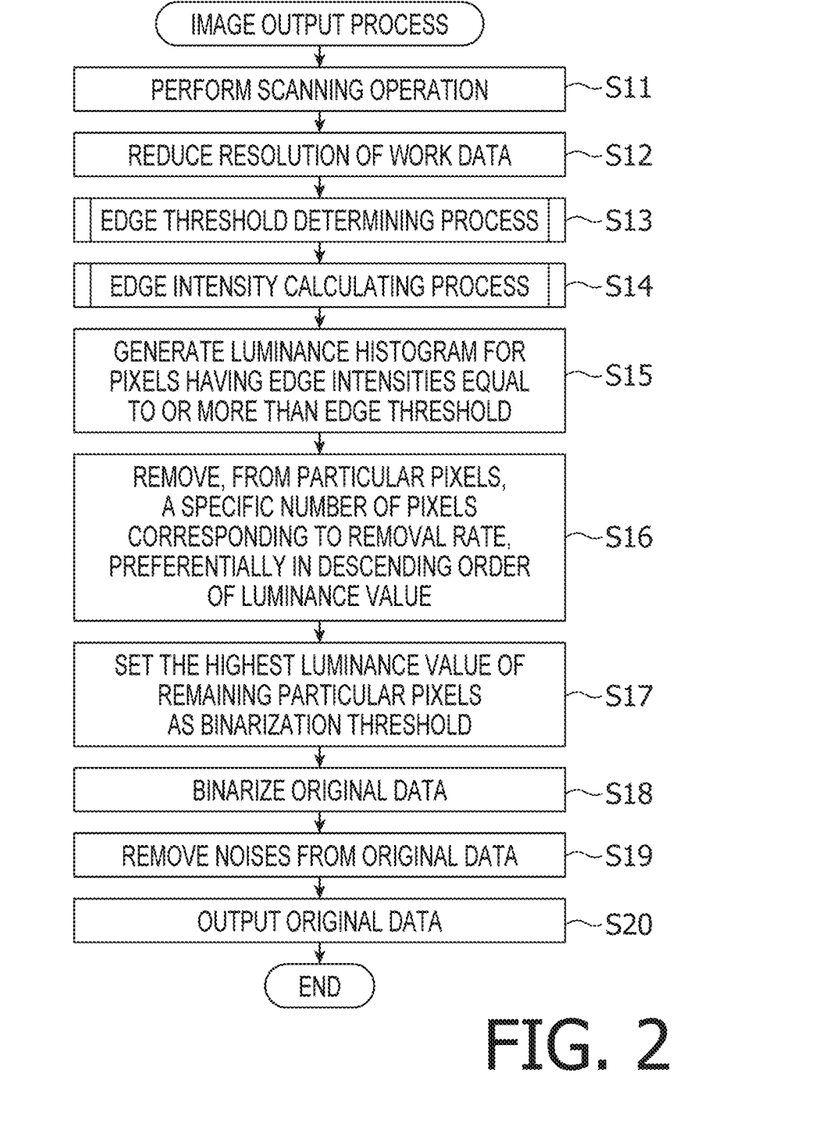
FIG. 2 is a flowchart showing a procedure of an image output process in the illustrative embodiment according to one or more aspects of the present disclosure.
Figure 3:
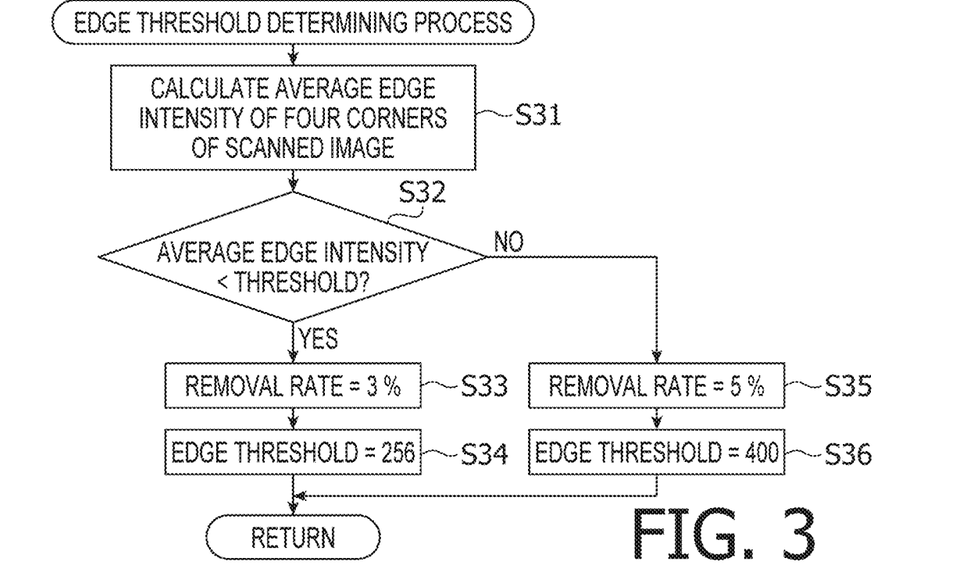
FIG. 3 is a flowchart showing a procedure of an edge threshold determining process in the illustrative embodiment according to one or more aspects of the present disclosure.
Figure 4:
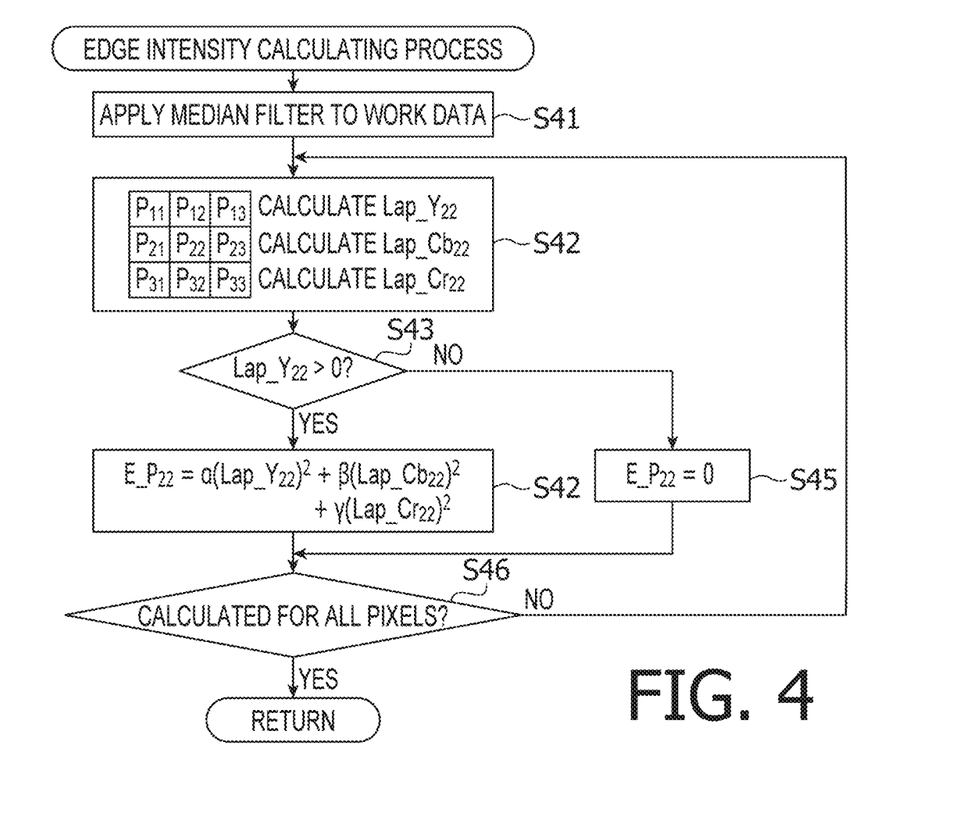
FIG. 4 is a flowchart showing a procedure of an edge intensity calculating process in the illustrative embodiment according to one or more aspects of the present disclosure.

Referring to FIGS. 2 to 4, operations by the system 100 of the illustrative embodiment will be described.

Flowcharts exemplified in the present disclosure basically show processes to be executed by the CPU 31 or the CPU 61 in accordance with instructions described in programs. Namely, in the following description, processes such as "determining," "extracting," "selecting," "calculating," "specifying," and "controlling" represent processes by the CPU 31 or the CPU 61. The processes by the CPU 31 and the CPU 61 may include hardware control via the OS 34 and the OS 64. Further, in the present disclosure, "data" is expressed by a computer-readable bit stream. Two or more pieces of data that have substantially the same meaning or contents but have different formats are treated as the same data. The same applies to "information."

By executing a terminal program 65 stored in the memory 62, the CPU 61 of the information processing terminal 50 begins to perform an image output process shown in FIG. 2. In the image output process, first, the CPU 61 transmits scan instruction information to the MFP 10 via the communication I/F 55, in accordance with a user operation accepted via the input I/F 54. The scan instruction information is information for instructing to execute a scanning operation. Subsequently, the CPU 61 receives, as a reply to the scan instruction information, scanned data from the MFP 10 via the communication I/F 55 (S11). Then, the CPU 61 temporarily stores into the memory 62 the scanned data (hereinafter, which may be referred to as "original data") received from the MFP 10. Hereinafter, S11 may be referred to as a "scan instruction process."

Further, in S11 (i.e., the scan instruction process), the CPU 31 of the MFP 10, executing the apparatus program 35 stored in the memory 32, receives the scan instruction information from the information processing terminal 50 via the communication I/F 25. Then, the CPU 31 causes the image scanner 12 to perform a scanning operation in accordance with the received scan instruction information. The image scanner 12 scans an image recorded on a document sheet set on a contact glass (not shown) or an ADF (not shown), and generates scanned data representing the scanned image. Then, the CPU 31 transmits the scanned data generated by the image scanner 12, to the information processing terminal 50 via the communication I/F 25.

In the illustrative embodiment, an example case where the document sheet shown in FIG. 5A is scanned will be described. Namely, the scanned data generated in S11 represents an image with the patterns "GOOD," "Morning," and "☆" synthetically superposed on the background color (e.g., a color of a sheet). In the scanned data, the pattern "Morning" has the highest density value. The pattern "☆" has the second highest density value. The pattern "GOOD" has the third highest density value. The background color has the lowest density value. For instance, a density value may represent a luminance value or an integrated value of RGB forming each pixel value. Namely, a "high density value" may denote a low luminance value or a low integrated value of RGB. Meanwhile, a "low density value" may denote a high luminance value or a high integrated value of RGB.

Subsequently, the CPU 61 makes a copy of the original data temporarily stored in S11, and temporarily stores the copy into the memory 62. Then, the CPU 61 reduces a resolution of work data (S12). For instance, the CPU 61 thins out pixels forming the work data in a simple thinning-out method. For instance, the resolution of the work data after the pixels have been thinned out is 100 dpi.

Next, the CPU 61 performs an edge threshold determining process (S13). The edge threshold determining process is a process to determine an edge threshold used for a below-mentioned edge intensity calculating process. Referring to FIG. 3, the edge threshold determining process will be described in detail.

First, the CPU 61 calculates an average edge intensity of four corners of the scanned image represented by the work data (S31). Specifically, for instance, the CPU 61 extracts 9 pixels (3×3 pixels) from each of the four corners of the scanned image. Then, the CPU 61 calculates an edge intensity of a center pixel of the extracted 9 pixels. Finally, the CPU 61 simply averages the calculated four edge intensities. A method for calculating an edge intensity will be described later with reference to FIG. 4. It is noted that S31 may be executed using the original data.

Subsequently, in response to determining that the average edge intensity calculated in S31 is less than a threshold (S32: Yes), the CPU 61 sets a removal rate to 3% (S33) and sets an edge threshold to 256 (S34). Meanwhile, in response to determining that the average edge intensity calculated in S31 is equal to or more than the threshold (S32: No), the CPU 61 sets the removal rate to 5% and sets the edge threshold to 400 (S35 and S36).

The removal rate is a rate of one or more pixels to be removed from among a plurality of pixels forming a histogram in a below-mentioned step S16. The edge threshold is used to determine whether to include each of the pixels forming the work data in the histogram in a below-mentioned step S15. The edge threshold is a value more than zero. It is noted that the removal rate and the edge threshold are not limited to the above-exemplified values.

Next, the CPU 61 performs an edge intensity calculating process (S14). The edge intensity calculating process is a process to calculate an edge intensity of each of all the pixels forming the work data. The edge intensity calculating process will be described in detail with reference to FIG. 4.

First, the CPU 61 applies a median filter to the work data (S41). For instance, the median filter is a filter that extracts N pixels (N is an integer equal to or more than two) from the work data, specifies a median of pixel values of the extracted N pixels, and overwrites the pixel values of the extracted N pixels with the specified median. By applying the median filter to a whole of the work data, it is possible to remove minute noise components included in the work data.

Next, the CPU 61 executes the steps S42 to S45 for all of the pixels forming the work data (S46: No). Hereinafter, the steps S42 to S45 for a target pixel $P_{22}$ will be described in detail. In the illustrative embodiment, it is noted that pixel values of each pixel forming the work data include a luminance value Y, a first color difference value Cb, and a second color difference value Cr.

Initially, the CPU 61 applies a Laplacian filter to pixel values of the target pixel P22 (S42). More specifically, the CPU 61 extracts, from the work data, pixel values Y, Cb, and Cr of the target pixel $P_{22}$ and pixel values Y, Cb, and Cr of 8 pixels $P_{11}$, $P_{12}$, $P_{13}$, $P_{21}$, $P_{23}$, $P_{31}$, $P_{32}$, and $P_{33}$ surrounding the target pixel $P_{22}$. Then, the CPU 61 calculates a luminance value $Lap\_Y_{22}$, a first color difference value $Lap\_Cb_{22}$, and a second color difference value $Lap\_Cr_{22}$ of the target pixel $P_{22}$ to each of which the Laplacian filter has been applied, using the following expressions.

$$Lap\_Y_{22}=(Y_{22}-Y_{11})+(Y_{22}-Y_{12})+(Y_{22}-Y_{13})+(Y_{22}-Y_{21})+(Y_{22}-Y_{23})+(Y_{22}-Y_{31})+(Y_{22}-Y_{32})+(Y_{22}-Y_{33})$$

$$Lap\_Cb_{22}=(Cb_{22}-Cb_{11})+(Cb_{22}-Cb_{12})+(Cb_{22}-Cb_{13})+(Cb_{22}-Cb_{21})+(Cb_{22}-Cb_{23})+(Cb_{22}-Cb_{31})+(Cb_{22}-Cb_{32})+(Cb_{22}-Cb_{33})$$

$$Lap\_Cr_{22}=(Cr_{22}-Cr_{11})+(Cr_{22}-Cr_{12})+(Cr_{22}-Cr_{13})+(Cr_{22}-Cr_{21})+(Cr_{22}-Cr_{23})+(Cr_{22}-Cr_{31})+(Cr_{22}-Cr_{32})+(Cr_{22}-Cr_{33})$$

In the above expressions, $Lap\_Y_{22}$ is an integrated value of a difference between the luminance value $Y_{22}$ of the target pixel $P_{22}$ and a luminance value $Y_{xx}$ of each of the pixels surrounding the target pixel $P_{22}$. $Lap\_Cb_{22}$ is an integrated value of a difference between the first color difference value $Cb_{22}$ of the target pixel $P_{22}$ and a first color difference value $Cb_{xx}$ of each of the pixels surrounding the target pixel $P_{22}$.

Lap_Cr$_{22}$ is an integrated value of a difference between the second color difference value Cr$_{22}$ of the target pixel P$_{22}$ and a second color difference value Cr$_{xx}$ of each of the pixels surrounding the target pixel P$_{22}$.

Subsequently, the CPU 61 determines whether the luminance value Lap_Y$_{22}$ calculated in S42 is more than zero (S43). For instance, a relationship "the luminance Lap_Y$_{22}$>0" represents that a density value of the target pixel P$_{22}$ is higher than density values of the pixels surrounding the target pixel P$_{22}$. Meanwhile, for instance, a relationship "the luminance Lap_Y$_{22}$≤0" represents that a density value of the target pixel P$_{22}$ is equal to or lower than density values of the pixels surrounding the target pixel P$_{22}$. Then, in response to determining that the luminance value Lap_Y$_{22}$ calculated in S42 is more than zero, i.e., the luminance Lap_Y$_{22}$>0 (S43: Yes), the CPU 61 calculates an edge intensity E_P$_{22}$ of the target pixel P$_{22}$ (S44). Meanwhile, in response to determining that the luminance value Lap_Y$_{22}$ calculated in S42 is equal to or less than zero, i.e., the luminance Lap_Y$_{22}$≤0 (S43: No), the CPU 61 sets the edge intensity E_P$_{22}$ of the target pixel P$_{22}$ to zero (S45).

For instance, in S44, the CPU 61 may calculate the edge intensity E_P$_{22}$ using the following expression. Namely, the CPU 61 calculates, as the edge intensity E_P$_{22}$, a sum of respective squares of the luminance value Lap_Y$_{22}$, the first color difference value Lap_Cb$_{22}$, and the second color difference value Lap_Cr$_{22}$ that the Laplacian filter is applied to. More specifically, the CPU 61 calculates, as the edge intensity E_P$_{22}$, a sum of a weighted square of the luminance value Lap_Y$_{22}$, a weighted square of the first color difference value Lap_Cb$_{22}$, and a weighted square of the second color difference value Lap_Cr$_{22}$.

$$E\_P_{22}=\alpha(Lap\_Y_{22})^2+\beta(Lap\_Cb_{22})^2+\gamma(Lap\_Cr_{22})^2$$

As an example, the weight coefficients α, β, and γ may satisfy the following expression.

$$\alpha=\beta=\gamma=1$$

As another example, the weight coefficients α, β, and γ may satisfy the following expressions.

$$\alpha=2, \beta=\gamma=\tfrac{1}{2}$$

Namely, the weight coefficient α multiplied by the square of the luminance value Lap_Y$_{22}$ may be equal to or more than the weight coefficient β multiplied by the square of the first color difference value Lap_Cb$_{22}$ and the weight coefficient γ multiplied by the square of the second color difference value Lap_Cr$_{22}$.

A pixel having a high edge intensity is a pixel with a large difference in the density value from its surrounding pixels. Namely, among a plurality of pixels forming the patterns "GOOD," "Morning," and "☆," each of pixels in contact with the background color has a high edge intensity. Further, among a plurality of pixels forming the background color, each of pixels in contact with the patterns "GOOD," "Morning," and "☆" has a high edge intensity. Among the pixels forming the background color, each of pixels in contact with the patterns "GOOD," "Morning," and "☆" has a lower density value than density values of its surrounding pixels (S43: No). Therefore, the edge intensity E_P$_{xx}$ is equal to zero (S45).

Meanwhile, a pixel having a low edge intensity is a pixel with a small difference in the density value from its surrounding pixels. Namely, among the plurality of pixels forming the patterns "GOOD," "Morning," and "☆," each of pixels not in contact with the background color has a low edge intensity. Likewise, among the plurality of pixels forming the background color, each of pixels not in contact with the patterns "GOOD," "Morning," or "☆" has a low edge intensity. Nonetheless, although the following features are not shown in FIG. 5A, among the plurality of pixels forming the background color, each of pixels in positions on which noises are superimposed exceptionally has a high edge intensity. For instance, the noises may be images that the user did not intend to scan, among images included in the scanned image represented by the scanned data. For example, the noises may be superimposed on the scanned data due to stains on the document sheet and/or the contact glass, or due to disturbance on a transmission path.

Subsequently, referring back to FIG. 2, the CPU 61 extracts pixels of which the edge intensity E_P$_{xx}$ calculated in S14 is equal to or more than the edge threshold determined in S13, from all of the pixels P$_{xx}$ forming the work data. Then, the CPU 61 generates a histogram of the luminance values of the extracted pixels (S15). For instance, the pixels of which the edge intensity E_P$_{xx}$ is equal to or more than the edge threshold are pixels in contact with the background color and pixels in positions on which noises are superimposed, among the plurality of pixels forming the patterns "GOOD," "Morning," and "☆."

Namely, for instance, as indicated by a solid line in FIG. 6, the histogram generated in S15 has lower peaks for the patterns "GOOD," "Morning," and "☆" than the corresponding peaks of the histogram indicated by the dashed line, and has no peak for the background color. The pixels for generating the histogram in S15 may be referred to as "particular pixels." Among all of the pixels forming the work data, each of the particular pixels has a higher density value than density values of its surrounding pixels and has a higher edge intensity than the edge threshold.

Next, the CPU 61 removes from among the particular pixels a specific number of pixels corresponding to the removal rate determined in S33 or S35, preferentially in descending order of the luminance value (S16). For instance, the removed pixels are pixels in the positions on which noises are superimposed. Subsequently, the CPU 61 sets, as a binarization threshold, a highest luminance value of particular pixels left without being removed in S16 (S17). For instance, the binarization threshold is determined to be a luminance value between the background color and the pattern "GOOD" having a lowest density value among all of the patterns. Hereinafter, the steps S15 to S17 may be referred to as a "binarization threshold determining process."

Subsequently, the CPU 61 generates a binary image from the original data, using the binarization threshold determined in S17 (S18). More specifically, the CPU 61 secures in the memory 62 a two-dimensional array for all of the pixels forming the original data. Next, the CPU 61 sets, to "1," elements of the two-dimensional array that correspond to pixels having luminance values equal to or higher than the binarization threshold among all of the pixels forming the original data. Further, the CPU 61 sets, to "0," elements of the two-dimensional array that correspond to pixels having luminance values lower than the binarization threshold among all of the pixels forming the original data. Hereinafter, S18 may be referred to as a "binarization process."

Figure 5B:
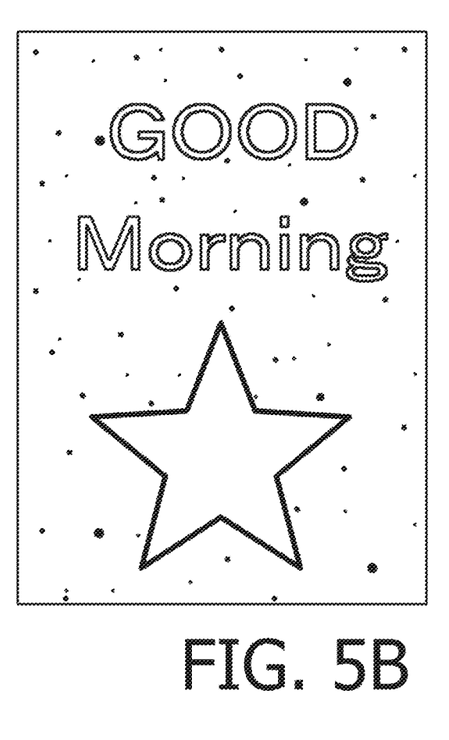
FIG. 5B shows a binary image generated based on a scanned image of the document sheet shown in FIG. 5A, in the illustrative embodiment according to one or more aspects of the present disclosure.

Thereby, for instance, a binary image shown in FIG. 5B is obtained. The binary image has the same number of pixels as the number of pixels of the scanned image represented by the original data. Further, in the binary image, the pixels corresponding to the elements "0" of the two-dimensional array are black pixels, and the pixels corresponding to the elements "1" of the two-dimensional array are white pixels.

Namely, in the binary image shown in FIG. 5B, outer edges of the patterns "GOOD," "Morning," and "☆" and the positions on which noises are superimposed are black, and the other positions are white.

Next, the CPU 61 removes noises from the original data, using the binary image generated in S18 (S19). For instance, in the binary image, the CPU 61 detects areas (hereinafter referred to as "isolated points") in which the number of continuous black pixels is less than a predetermined threshold. Then, in the original data, the CPU 61 overwrites pixels corresponding to the isolated points with a pixel value of the background color. For instance, the pixel value of the background color may be the most frequent value in the histogram of the pixel values of the original data. Hereinafter, S19 may be referred to as a "noise removal process."

Next, the CPU 61 outputs the original data from which the noises have been removed (S20). For instance, in S20, the CPU 61 may output the original data into a particular area of the memory 62, or may upload the original data into a server on the Internet. Alternatively, in S20, the CPU 61 may cause the MFP 10 to record on a sheet an image represented by the original data. Furthermore, in S20, the CPU 61 may output binary image data representing the binary image, along with or instead of the original data from which the noises have been removed.

[Operations and Advantageous Effects of Illustrative Embodiment]

Generally, in comparison between pixels forming patterns (e.g., pictures and characters) and pixels forming a background color (e.g., a color of a sheet), density values of the pixels forming the patterns are higher than a density value of the pixels forming the background color. In the aforementioned illustrative embodiment, the binarization threshold is determined only based on the particular pixels each of which has a density value higher than density values of its surrounding pixels and has an edge intensity higher than the edge threshold. Therefore, it is possible to calculate an appropriate binarization threshold without being influenced by the pixels forming the background color. Consequently, it is possible to generate a binary image in which the patterns and the background color contained in the scanned data are appropriately separated.

In the aforementioned illustrative embodiment, the highest luminance value of the particular pixels is used as the binarization threshold. Nonetheless, for instance, the binarization threshold may be an integrated value of RGB instead of a luminance value. For instance, in S17, the CPU 61 may set, as the binarization threshold, an integrated value of RGB of particular pixels having the highest luminance value. Then, for instance, in S18, the CPU 61 may binarize all the pixels forming the original data to separate pixels having integrated values of RGB equal to or more than the binarization threshold from pixels having integrated values of RGB less than the binarization threshold.

Further, in the aforementioned illustrative embodiment, the steps S13 to S17 are executed using the work data having a resolution lower than a resolution of the original data. Therefore, it is possible to reduce the number of pixels of which edge intensities are to be calculated. Consequently, particularly in S14, it is possible to reduce a processing load of the CPU 61.

Further, in the aforementioned illustrative embodiment, the CPU 61 sets, as the binarization threshold, the highest luminance value of particular pixels left after noise components have been removed in S16. Therefore, it is possible to generate a binary image in which the patterns and the background color contained in the scanned data are appropriately separated. It is noted that the four corners of the scanned image represented by the scanned data are highly likely to have the background color. Further, when an image recorded on a recycled paper is scanned, pixels having the background color in the scanned data tend to have high edge intensities due to irregular reflection of light in the image scanning. In the aforementioned illustrative embodiment, when the average edge intensity calculated in S31 is equal to or more than the threshold (S32: No), the CPU 61 increases the number of pixels to be removed, or sets the edge threshold to a relatively high value. Thereby, it is possible to appropriately remove pixels having the background color and set the binarization threshold.

Before performing the image output process, the CPU 61 executing the terminal program 65 may accept via the input I/F 54 a user operation indicating whether to execute the noise removal process. Then, in response to accepting a user operation indicating that the noise removal process is to be performed, the CPU 61 may set to "ON" a noise removal flag stored in the memory 62. Meanwhile, in response to accepting a user operation indicating that the noise removal process is not to be performed, the CPU 61 may set the noise removal flag to "OFF."

Further, in the image output process, when the noise removal flag is set to "ON," the CPU 61 executing the terminal program 65 may perform S19. Meanwhile, when the noise removal flag is set to "OFF," the CPU 61 executing the terminal program 65 may skip S19. Further, in the edge threshold determining process, when the noise removal flag is set to "ON," the CPU 61 executing the terminal program 65 may set the removal rate to 3%. Meanwhile, when the noise removal flag is set to "OFF," the CPU 61 executing the terminal program 65 may set the removal rate to 5%.

Further, in the aforementioned illustrative embodiment, the noise removal process is performed using a binary image in which the patterns and the background color are appropriately separated. Thus, it is possible to obtain original data with noises appropriately removed therefrom. It is noted that image processing for original data using a binary image may be applied not only to noise removal but also to thickening characters.

In the aforementioned illustrative embodiment, an example has been presented in which the image output process is performed by the information processing terminal 50 that is connected with the MFP 10 via the communication I/F 55. Nonetheless, the image output process may be performed by the CPU 31 of the MFP 10 that is connected with the image scanner 12 via the communication bus 33.

Further, in the aforementioned illustrative embodiment, an example has been presented in which when one or more programs stored in the memory 32 or the memory 62 are executed by the CPU 31 or the CPU 61, each of processes to be executed by the controller according to aspects of the present disclosure is implemented. Nonetheless, the controller according to aspects of the present disclosure is not limited to what has been exemplified in the illustrative embodiment. A part or a whole of the controller may be formed, e.g., by integrated circuits.

As exemplified in the aforementioned illustrative embodiment, aspects of the present disclosure may be achieved as the system 100 including the MFP 10 and the information processing terminal 50. Further, aspects of the present disclosure may be achieved as an integrated apparatus including the MFP 10 and the information processing terminal 50. Further, aspects of the present disclosure may be achieved as the MFP 10 or the information processing terminal 50 solely. Further, aspects of the present disclosure may be achieved as a method for the MFP 10 and the information processing terminal 50 to perform processes. Further, aspects of the present disclosure may be achieved as one or more programs that cause the MFP 10 and the information processing terminal 50 to perform processes. The one or more programs may be provided in a form stored in a non-transitory computer-readable medium. In other words, aspects of the present disclosure may be achieved as a non-transitory computer-readable medium storing the one or more programs. The non-transitory computer-readable medium may include but is not limited to a CD-ROM, a DVD-ROM, and a memory incorporated in a server that is connectable with the MFP 10 and the information processing terminal 50 via the communication network 101. The one or more programs stored in the memory of the server may be transmitted via the communication network 101 such as the Internet, as information or signals representing the one or more programs.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein.

What is claimed is:

1. An image processing apparatus comprising:
   an image scanner; and
   a controller configured to:
      control the image scanner to generate scanned data by scanning an image recorded on a document sheet;
      calculate an edge intensity of each of pixels included in the scanned data;
      determine a binarization threshold from pixel values of particular pixels, the particular pixels being a part of the pixels included in the scanned data, each particular pixel having a density value higher than density values of surrounding pixels of the particular pixel, each particular pixel having an edge intensity equal to or higher than an edge threshold, the particular pixels being separated from background pixels that represent a background color of the scanned data; and
      generate a binary image from the scanned data, using the binarization threshold.

2. The image processing apparatus according to claim 1, wherein the controller is further configured to:
   remove, from among the particular pixels, a specific number of pixels preferentially in descending order of luminance values of the particular pixels; and
   set, as the binarization threshold, a highest luminance value of particular pixels remaining after the specific number of pixels have been removed.

3. The image processing apparatus according to claim 2, wherein the controller is further configured to:
   calculate an average edge intensity by averaging edge intensities of pixels at four corners of a scanned image represented by the scanned data;
   in a case where the average edge intensity is less than a threshold, set a removal rate to a first removal rate;
   in a case where the average edge intensity is equal to or more than the threshold, set the removal rate to a second removal rate higher than the first removal rate; and
   remove, from among the particular pixels, the specific number of pixels corresponding to the set removal rate.

4. The image processing apparatus according to claim 2, further comprising:
   an input interface; and
   a memory,
   wherein the controller is further configured to:
      accept a user operation via the input interface;
      set a noise removal flag stored in the memory to one of a first flag value and a second flag value in accordance with the user operation, the first flag value representing that noise data is to be removed from the scanned data, the second flag value representing that noise data is not to be removed from the scanned data; and
      in response to the noise removal flag being set to the first flag value, remove noise data from the scanned data, using the binary image generated in the binarization process, and
   wherein the controller is further configured to:
      in response to the noise removal flag being set to the first flag value, remove, from among the particular pixels, the specific number of pixels corresponding to a first removal rate; and
      in response to the noise removal flag being set to the second flag value, remove, from among the particular pixels, the specific number of pixels corresponding to a second removal rate, the second removal rate being higher than the first removal rate.

5. The image processing apparatus according to claim 1, wherein the controller is further configured to:
   calculate an average edge intensity by averaging edge intensities of pixels at four corners of a scanned image represented by the scanned data;
   in a case where the average edge intensity is less than a threshold, set the edge threshold to a first threshold value;
   in a case where the average edge intensity is equal to or more than the threshold, set the edge threshold to a second threshold value higher than the first threshold value; and
   determine the binarization threshold, using the set edge threshold.

6. The image processing apparatus according to claim 1, wherein the controller is further configured to:
   apply a Laplacian filter to each of a luminance value, a first color difference value, and a second color difference value of a target pixel of the pixels included in the scanned data; and
   calculate, as an edge intensity of the target pixel, a sum of respective squares of the luminance value, the first color difference value, and the second color difference value to each of which the Laplacian filter has been applied.

7. The image processing apparatus according to claim 6, wherein the controller is further configured to:
calculate, as the edge intensity of the target pixel, a sum of:
a first weight coefficient multiplied by the square of the luminance value to which the Laplacian filter has been applied;
a second weight coefficient multiplied by the square of the first color difference value to which the Laplacian filter has been applied, the second weight coefficient being less than the first weight coefficient; and
a third weight coefficient multiplied by the square of the second color difference value to which the Laplacian filter has been applied, the third weight coefficient being less than the first weight coefficient.

8. The image processing apparatus according to claim 1, wherein the controller is further configured to:
decimate the pixels included in the scanned data; and
calculate an edge intensity of each of pixels remaining after the pixels included in the scanned data have been decimated.

9. The image processing apparatus according to claim 1, wherein the controller is further configured to:
remove noise data from the scanned data, using the binary image generated in the binarization process.

10. The image processing apparatus according to claim 1, wherein the controller comprises:
a processor; and
a memory storing processor-executable instructions configured to, when executed by the processor, cause the processor to:
control the image scanner to generate the scanned data by scanning the image recorded on the document sheet;
calculate the edge intensity of each pixel included in the scanned data;
determine the binarization threshold from the pixel values of the particular pixels; and
generate the binary image from the scanned data, using the binarization threshold.

11. A method implementable on a processor coupled with an image scanner, the method comprising:
controlling the image scanner to generate scanned data by scanning an image recorded on a document sheet;
calculating an edge intensity of each of pixels included in the scanned data;
determining a binarization threshold from pixel values of particular pixels, the particular pixels being a part of the pixels included in the scanned data, each particular pixel having a density value higher than density values of surrounding pixels of the particular pixel, each particular pixel having an edge intensity equal to or higher than an edge threshold, the particular pixels being separated from background pixels that represent a background color of the scanned data; and
generating a binary image from the scanned data, using the binarization threshold.

12. A non-transitory computer-readable medium storing computer-readable instructions that are executable by a processor coupled with an image scanner, the instructions being configured to, when executed by the processor, cause the processor to:
control the image scanner to generate scanned data by scanning an image recorded on a document sheet;
calculate an edge intensity of each of pixels included in the scanned data;
determine a binarization threshold from pixel values of particular pixels, the particular pixels being a part of the pixels included in the scanned data, each particular pixel having a density value higher than density values of surrounding pixels of the particular pixel, each particular pixel having an edge intensity equal to or higher than an edge threshold, the particular pixels being separated from background pixels that represent a background color of the scanned data; and
generate a binary image from the scanned data, using the binarization threshold.

* * * * *